(12) United States Patent
Stolle et al.

(10) Patent No.: US 8,842,556 B2
(45) Date of Patent: Sep. 23, 2014

(54) METHOD AND SYSTEM FOR TRANSMITTING AND RECEIVING DATA OVER A COMMUNICATION CHANNEL BETWEEN TWO TRANSCEIVER STATIONS

(75) Inventors: Reinhard Stolle, Neufahrn (DE); Thyagarajan Umashankar, Munich (DE)

(73) Assignee: Lantiq Deutschland GmbH, Neubiberg (DE)

( * ) Notice: Subject to any disclaimer, the term of this patent is extended or adjusted under 35 U.S.C. 154(b) by 1717 days.

(21) Appl. No.: 11/735,205

(22) Filed: Apr. 13, 2007

(65) Prior Publication Data

US 2008/0305748 A1 Dec. 11, 2008

(51) Int. Cl.
*H04L 12/58* (2006.01)
*H04L 12/24* (2006.01)

(52) U.S. Cl.
CPC .................................. *H04L 41/0896* (2013.01)
USPC .......................................... 370/252; 370/464

(58) Field of Classification Search
USPC ............... 370/480, 481, 493–496; 379/90.01, 379/93.01; 307/252
See application file for complete search history.

(56) References Cited

U.S. PATENT DOCUMENTS

| 6,266,347 B1 * | 7/2001 | Amrany et al. ............... 370/478 |
| 6,278,728 B1 * | 8/2001 | McHale et al. ............... 375/219 |
| 6,452,907 B1 * | 9/2002 | Levin ........................... 370/252 |
| 6,628,754 B1 * | 9/2003 | Murphy et al. ............. 379/1.03 |
| 2001/0048667 A1 * | 12/2001 | Hamdi ......................... 370/252 |

* cited by examiner

*Primary Examiner* — Phuc Tran

(57) ABSTRACT

Methods and systems for transmitting and receiving data over a communication channel between two transceiver stations are disclosed. A first decision is made during an initialization process, wherein the first decision comprises selecting a first subset of communication parameters. A second decision is made during the initialization process wherein the second decision comprises deciding whether one or more of the communication parameters of the first subset are to be changed depending on information collected about the communication channel.

23 Claims, 4 Drawing Sheets

METHOD AND SYSTEM FOR TRANSMITTING AND RECEIVING DATA OVER A COMMUNICATION CHANNEL BETWEEN TWO TRANSCEIVER STATIONS

FIELD OF THE INVENTION

The present invention relates to a method for transmitting and receiving data over a communication channel between two transceiver stations, a transceiver for transmitting and receiving data over a communication channel between two transceiver stations and a system for transmitting data over a communication channel between two transceiver stations.

BACKGROUND OF THE INVENTION

Digital subscriber line (DSL) technologies provide potentially large bandwidth for digital communication over existing telephone subscriber lines. The DSL technologies were designed in a way that they could peacefully coexist with the standard POTS (Plain Old Telephone Service) frequency spectrum. The two services can coexist because the DSL spectrum only uses frequencies above the POTS spectrum. The POTS spectrum ranges from frequency levels near that of direct current (DC) to approximately 4 kHz. The ADSL (Asymmetric DSL) frequency spectrum starts above the POTS spectrum and extends up to approximately 1.1 MHz. A frequency guard band is placed between the POTS spectrum and the ADSL spectrum to help avoid interference. The lower-frequency part of the ADSL spectrum is for upstream transmission (i.e., from the customer to the central office) and the upper-frequency part of the ADSL spectrum is for downstream transmission (i.e., from the central office to the customer).

In particular, ADSL can be adjusted to the characteristics of the subscriber line by using the so-called discrete multi-tone (DMT) technique. The DMT technique employs frequency division multiplexing by dividing the bandwidth of a twisted pair into a number of frequency carriers or sub-carriers which are called tones. The frequency carriers or sub-carriers are mostly spaced at 4.3125 kHz intervals, with 224 of the carriers or sub-carriers used for the downstream data in the range from 138 kHz to 1.1 MHz and 25 of the carriers or sub-carriers used for the upstream data in the range from 26 kHz to 133 kHz in case of frequency division duplexing.

Among the ADSL technologies, new technologies called "Very High Bit Rate DSL" (VDSL) have been developed. Meanwhile a new standard, namely the VDSL2 (G.993.2) standard, was approved by the International Telecommunication Union-Telecommunication (ITU-T) Section in May 2006. The VDSL2 standard is designed to increase both data rate and physical reach over the copper network, achieving data rates in excess of 25 Mbps over long loops (4-6 kft) and symmetrical data rates of 100 Mbps over short loops (less than 1 kft). The VDSL2 standard includes many of the features and functionalities contained in the former Asymmetric Digital Subscriber Line 2 (ADSL2+) standard, including advanced diagnostics, a common management interface and the ability to maximize the use of bandwidth and bit rate, making it an ideal access technology for delivering video.

The VDSL2 standard is a very complex standard supporting a wide range of capabilities and settings. To reduce the complexity of using VDSL2 and confronting the wide range of settings, VDSL2 supports "profiles" that represent subsets of the full range of settings, with each of the profiles being directed to addressing different deployment contexts. The profiles correspond to various band plans and specify numerous parameters ranging from geographic-specific requirements to variations of reach and bandwidth. In particular, the VDSL2 standard defines a wide range of settings for various parameters that could potentially be supported by a VDSL2 transceiver. Profiles are specified to allow transceivers to support a subset of the allowed settings and still be compliant with the protocol standard. The specification of multiple profiles allows vendors to reduce implementation complexity and develop implementations that target specific service requirements.

BRIEF DESCRIPTION OF THE SEVERAL VIEWS OF THE DRAWINGS

In the following, specific embodiments of the invention will be explained in more detail in the following text with reference to the accompanying drawings, in which.

DETAILED DESCRIPTION OF THE INVENTION

Figure 1:
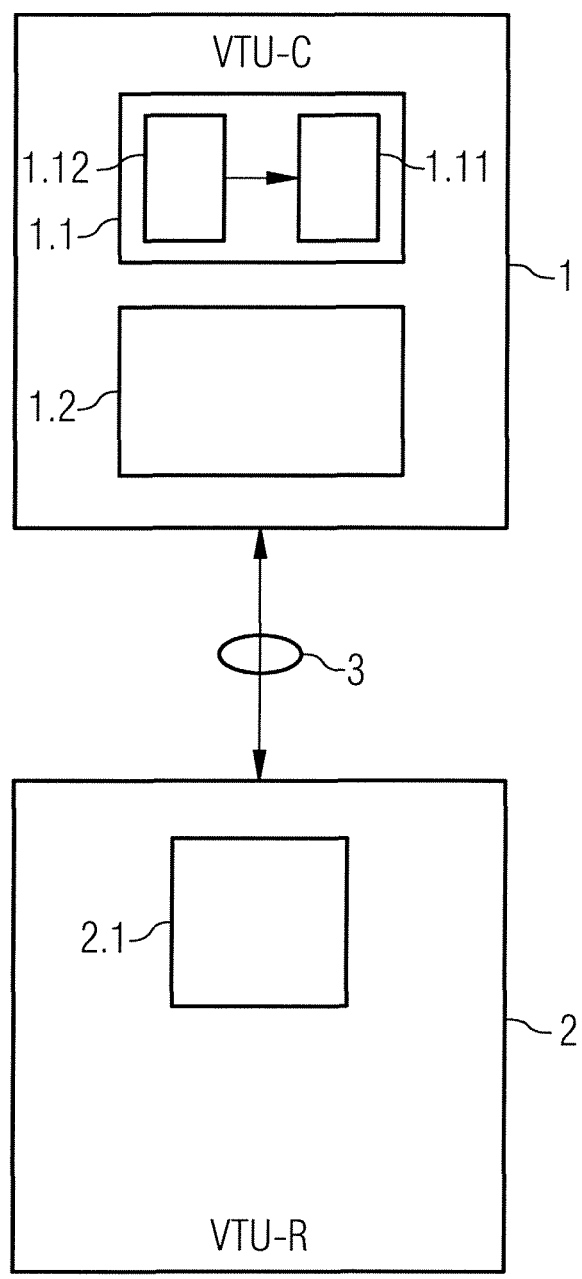
FIG. 1 is a functional block diagram of an embodiment of a system for transmitting data over a communication channel between two transceiver stations.

The aspects and embodiments of the invention are now described with reference to the drawings, wherein like reference numerals are generally utilized to refer to like elements throughout. In the following description, for purposes of explanation, specific details are set forth in order to provide a thorough understanding of one or more aspects of embodiments of the invention. It may be evident, however, to one skilled in the art that one or more aspects of the embodiments of the invention may be practiced with a lesser degree of the specific details. In other instances, known structures and devices are shown in a block diagram or schematic form in order to facilitate describing one or more aspects of the embodiments of the invention. The following description is therefore not to be taken in a limiting sense, and the scope of the invention is defined by the appended claims.

The following description outlines embodiments of a method and a system designed for transmitting and receiving data over a communication channel between two transceiver stations. The description also outlines a transceiver for transmitting and receiving data over a communication channel between two transceiver stations. The data to be transmitted or received can be any kind of data, for example, voice-related data, video data, memory data etc. The transceiver stations can be any kind of transceiver stations designed and adapted for transmitting and receiving data over wire-bound or wireless communication lines or paths. Accordingly, the communication channel can be any kind of communication channel, for example, a communication channel of a wire-bound communication or a wireless communication.

FIG. 1 is a block diagram showing an embodiment of a system for transmitting and receiving data over a communication channel 3 between two transceiver stations. The system comprises a first transceiver station 1 and a second transceiver station 2. The communication channel 3 can be, for example, a VDSL transmission line and the two transceiver stations can comprise, for example, two VDSL transceivers. The first VDSL transceiver 1 can be a VDSL transceiver at a central office station wherein such a VDSL transceiver is normally designated as a VDSL transceiver unit central (VTU-C). The second VDSL transceiver 2 can be, for example, a VDSL transceiver at a remote station on customer premises, wherein such a VDSL transceiver is normally designated as a VDSL receiver-remove (VTU-R).

In order to simplify the task of configuring network equipment, the VDSL2 standard defines subsets of communication parameters called profiles tailored for different deployment situations for use in contexts such as central offices, remote digital subscriber line access multiplexers (DSLAMs), digital loop carriers, and multi-dwelling units. The VDSL2 standard G.993.2 defines eight profiles designated as 8a, 8b, 8c, 8d, 12a, 12b, 17a and 30a. These profiles define power options from 11.5 dBm to 20.5 dBm, bandwidths up to 30 MHz, and a minimum data rate for each profile.

In an initialization process, data are exchanged between the first transceiver 1 and the second transceiver 2 in order to exchange basic, needed information between the two stations. Referring again to FIG. 1, the first transceiver 1 comprises a first decision unit 1.1 which is adapted for making a first decision during the initialization process, the first decision comprising selecting a first subset of communication parameters. The first transceiver 1 further comprises a second decision unit 1.2 which is adapted for making a second decision during the initialization process, the second decision comprising deciding to change whether one or more of the communication parameters of the first subset as selected by the first decision unit 1.1 depending on information about the communication channel 3.

The information about the communication channel 3 may comprise, for example, information about a signal-to-noise ratio of data transmitted over the communication channel 3. Alternatively or additionally, the information about the communication channel 3 may comprise information about the channel attenuation, such as, for example, information about a physical length $l_0$ or an electrical length $kl_0$, where k is a phase constant of selected the medium of the communication channel 3 and $kl_0$ reflects attenuation of a signal at a selected frequency through the length of the of communications medium.

The first decision unit 1.1 of the first transceiver 1 may comprise, for example, a storage unit 1.11 and a selector unit 1.12 as depicted in FIG. 1. The storage unit 1.11 stores a plurality of profiles that specify subsets of VDSL2 communication parameters. The selector unit 1.12 is coupled to the storage unit 1.11 for selecting a profile or subset of communication parameters from among the plurality of profiles or subsets of communication parameters stored in the storage unit 1.11. The selected profile or subset of communication parameters can then be communicated over the communication channel 3 to the second transceiver 2. For example, if there are eight profiles stored in the storage unit 1.11, as is the case for a band plan under the VDSL2 standard, then the selected profile may be communicated by transmitting one byte in which one of the eight bits representing the selected profile is set to "1," while the remaining bits are set to "0." The first decision made by the first decision unit 1.1 may be made after a first phase of the initialization process, namely after a handshaking process as will be explained later.

The second transceiver 2 may comprise, for example, a collection unit 2.1 for gathering information about the communication channel 3 which information can be used by the first transceiver 1 for making the second decision as depicted in FIG. 1. The collection unit 2.1 may, for example, gather the information about the communication channel 3 during the initialization process. According to one embodiment, a discrete multi-tone (DMT) technique is employed in the communication between the two transceivers 1 and 2. A bit allocation is performed by allocating bits of a bit stream to be transmitted to the frequency carriers, and the gains of the frequency carriers or sub-carriers also are determined. The signal-to-noise ratio of each frequency carrier can be measured and then a number of bits can be assigned to the frequency carrier according to its signal quality as represented by its signal-to-noise ratio (SNR).

The collection unit 2.1 can be arranged such that it determines the bits representing the SNR and gains of the frequency carriers for transmitting them in form of a table to the first transceiver 1. The second decision unit 1.2 can then evaluate this information by extracting the SNR value or values from the bits and gains and make a decision on whether the communication parameters are to be changed. The second decision unit 1.2 may also decide to select another subset of communication parameters from among the plurality of subsets of communication parameters stored in the storage unit 1.11, i.e., to select another profile from among the profiles stored in the storage unit 1.11. For example, the second decision unit 1.2 may reconstruct the actual SNR of the downstream from the bits and gains table received from the second transceiver. It may extrapolate this information to determine the potential data rates of a selection of profiles, and it may further select the profile with the maximum extrapolated data rate as the final profile.

Figure 2:
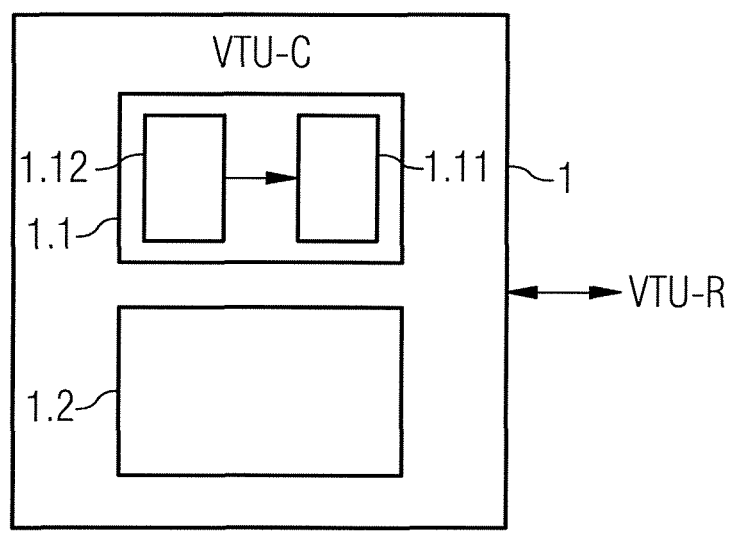
FIG. 2 is a functional block diagram of an embodiment of a transceiver for transmitting and receiving data over a communication channel between two transceiver stations.

FIG. 2 shows a block diagram representation of an embodiment of a single transceiver configured for transmitting and receiving data over a communication channel between two transceiver stations. As shown in FIG. 2, the transceiver 1 includes the same components, such as the first decision unit 1.1 and its storage unit 1.11 and its selector unit 1.12, as well as a second decision unit 1.2, and having the same structure as the first transceiver 1 depicted in FIG. 1. Embodiments of an apparatus for transmitting and receiving data over a communication channel include single transceivers, and thus are not limited to systems including a pair of transceivers joined over a communication channel 3 as illustrated in FIG. 1.

Another aspect of transmitting and receiving data over a communication channel relates to a method for transmitting and receiving data over a communication channel between two transceiver stations in which a first decision is made during an initialization process. The first decision comprises initially selecting a first profile of first subset of communication parameters, and making a second decision during the initialization process. The second decision comprises deciding whether one or more of the communication parameters of the first subset are to be changed depending on information gathered about the communication channel. The method can be implemented in hardware, as exemplified by the embodiment of a system as depicted in FIG. 1, or by the embodiment of a transceiver as depicted in FIG. 2.

The method may be implemented by software or firmware. Accordingly, a further aspect relates to a computer program product which comprises program code sections for conducting the method as outlined above. A computer program product may be stored on a computer-readable recording medium and it may loaded onto and run on a digital signal processor (DSP), a microprocessor, or a micro-controller.

Figure 3:
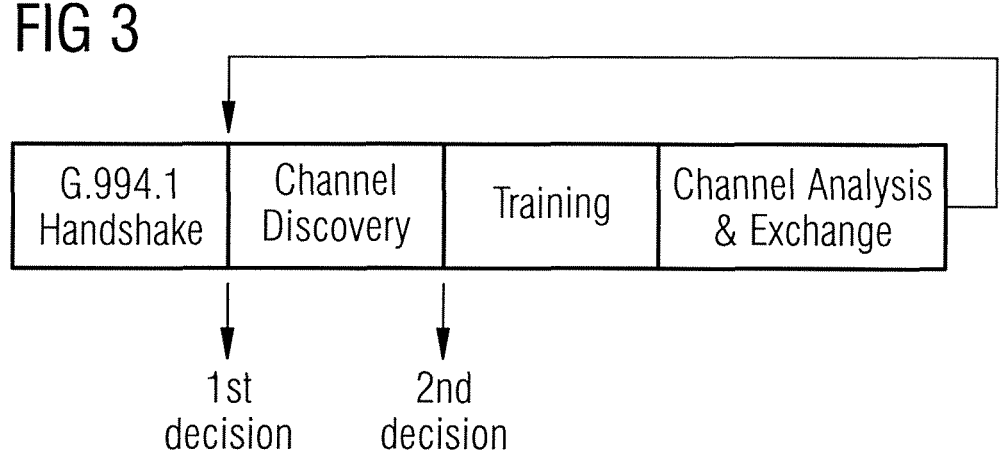
FIG. 3 is a flow diagram of a method for transmitting and receiving data over a communication channel between two transceiver stations.

FIG. 3 shows a flow diagram of a method for transmitting and receiving data over a communication channel between two transceiver stations. FIG. 3 illustrates an initialization process 3.0 in a VDSL system. In particular, FIG. 3 illustrates an initialization process 3.0 which involves use of the discrete multi-tone (DMT) technique. The initialization process 3.0 can be divided into a handshake process 3.1 according to the ITU standard G.994.1 and an actual initialization process 3.2. During the handshake process 3.1, basic information needed is exchanged between the two modems of the two transceivers, where this basic information includes, for example, operation modes, a Fast Fourier Transform (FFT) size, a cyclic extension length, frequency band information, etc. In the succeeding actual initialization process 3.2, the two modems obtain all system parameters which used in the so-called "showtime" the stage in which payload data are actually communicated. The actual initialization process 3.2 according to the G.993.2 standard contains three phases: channel discovery 3.21, training 3.22, and channel analysis and exchange 3.23.

FIG. 3 also indicates at which points of time the first decision 3.31 and the second decision 3.32 can be made. The first decision 3.31 for the selection of a profile or a particular subset of communication parameters is made after completion of the G.994.1 handshake process 3.1. The second decision 3.32 can be made, for example, at the end of the channel discovery phase 3.21. If another profile has been determined by the second decision unit 1.2 (FIGS. 1 and 2) of the first transceiver 1, part of the initialization phase 3.2 can be repeated with the parameters specific to the newly selected profile, as indicated by arrow 3.33. In particular, the channel discovery phase 3.21, the training phase 3.22, and the channel analysis and exchange phase 3.23 can be repeated with the parameters specific to the new profile. According to one embodiment, the initialization 3.0 may step back to the beginning of the channel discovery phase (CD) 3.21 once the channel analysis and exchange phase (CA) 3.22 is completed. If the selection of a new profile involves the selection of a new value of the spacing between the carriers, it will be recommended to repeat the initialization phase 3.2. It can also be the case, however, that in the second decision 3.32 it is decided not to change the profile. In this case there is no reason for performing a repetition of any part of the initialization process and the system may directly switch to showtime.

As mentioned above, it can also be the case that the second decision 3.32 is made based upon on the value $kl_0$ of the electrical length of the cable if the communication channel 3 (FIG. 1) is a wire-bound transmission line as, for example, in case of VDSL. The value $kl_0$ can be reported from the second VDSL transceiver 2 to the first VDSL transceiver 1 during the channel discovery phase 3.21. The second decision unit 1.2 of the first VDSL transceiver 1 may then decide on the basis of the value $kl_0$ whether the profile should be changed or not.

Figure 4:
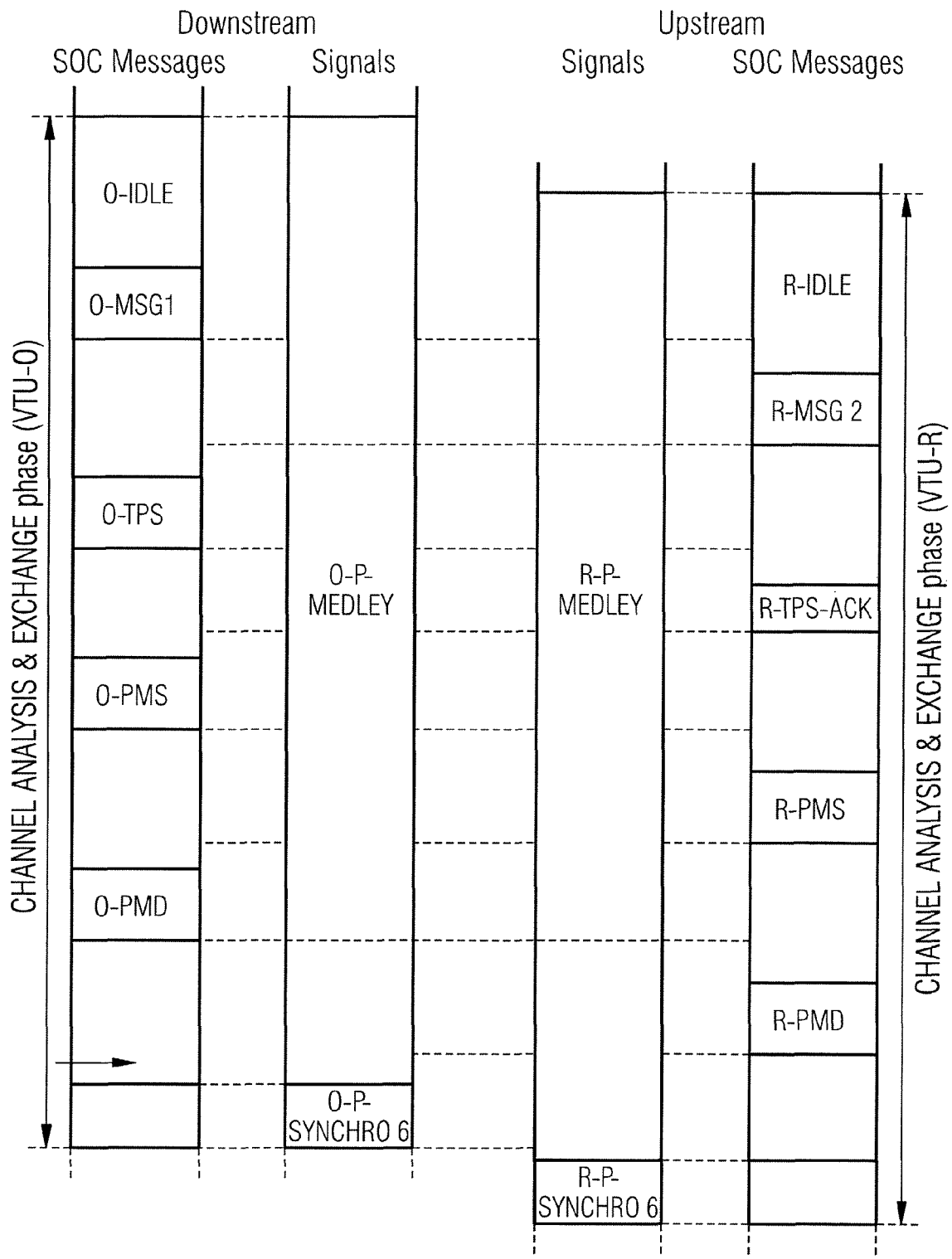
FIG. 4 is a timing diagram of messages transmitted during the channel analysis and exchange phase according to one embodiment.

FIG. 4 shows a timing diagram 4.0 of messages transmitted between the two modems of the transceiver stations during the channel analysis and exchange phase according to one embodiment of transmitting and receiving data over a communication channel between two transceiver stations. Three pieces of information are proposed to be sent from the first VDSL transceiver 1 to the second VDSL transceiver 2 upon the end of the channel analysis and exchange phase indicated by the arrow 4.1:

1. The final profile;
2. A request for a step back to the channel discovery phase; and
3. Status information in order to avoid endless loops.

The above information may be arranged in the form of the following table (Table 1):

TABLE 1

Description of message O-PROFILE

| | Field name | Format |
|---|---|---|
| 1 | Final profile | 1 byte |
| 2 | Request for resuming of Channel Discovery | 1 byte |
| 3 | Loop status | 1 byte |

The above information as arranged according to Table 1 can be put in a new master or central profile message (O-PROFILE) at the end of the channel and analysis and exchange phase 4.1.

Since the "decision-making" may take the first VDSL transceiver 1 some time to accomplish, according to one embodiment of transmitting and receiving data over a communication channel between two transceiver stations, the transition to showtime is delayed. One way to achieve the delay is to increase the length of a valid timeout occurring directly right after the issuance of the Remote-Physical Dependent Message (R-PMD) message 4.2 as shown in FIG. 4.

Figure 5:
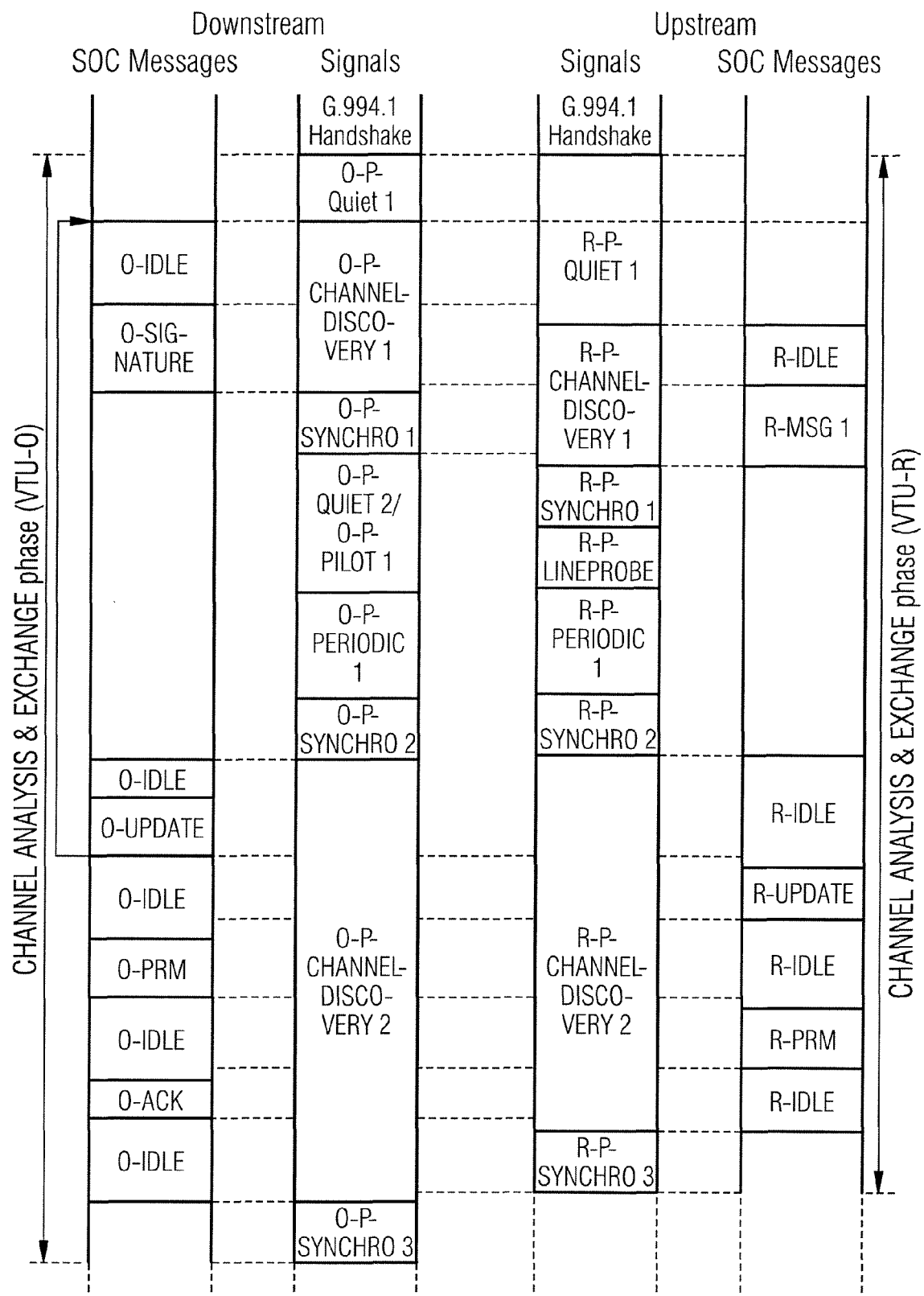
FIG. 5 is a timing diagram of messages transmitted during the channel discovery phase according to another embodiment.

FIG. 5 shows a timing diagram 5.0 of messages transmitted between the two modems of the transceiver stations during the channel discovery phase according to a further embodiment. A further way to include the information about the chosen profile in the channel discovery protocol is to put it in the update message generated by the master or central VDSL transceiver unit (O-UPDATE message) 5.1. In the following table (Table 2) a modified arrangement of the O-UPDATE message 5.1 is shown. Line No. 8 of Table 2 is an example of an extension for transmitting the final profile.

TABLE 2

Description of message O-UPDATE

| | Field name | Format |
|---|---|---|
| 1 | Message descriptor | Message code |
| 2 | Final electrical length | 2 bytes |
| 3 | Updated upstream PSD ceiling (MAXMASKus) | 2 bytes |
| 4 | Highest allowed upstream sub-carrier | 2 bytes |
| 5 | Lowest allowed upstream sub-carrier | 2 bytes |
| 6 | BLACKOUTus set | Bands descriptor |
| 7 | Timing advance correction | 2 bytes |
| 8 | Final Profile | 1 byte |

If the chosen final profile requires the carrier spacing to be changed, the protocol desirably permits reverting to the beginning of the channel discovery phase. One possible way to do so is to resume the channel discovery phase with the first master or central to physical channel discovery (O-P-CHANNEL-DISCOVERY 1) signal, right after completion of the O-UPDATE message 5.1 (see FIG. 5). The explicit information about the resumption of the O-P-CHANNEL-DISCOVERY 1 signal 5.2 can also be put into field 8 of the O-UPDATE message 5.2 as shown in the above Table 2.

In case the profile decision shall be taken based on an estimation of the SNR, a remote signal to noise (R-SNR) message may be inserted before the remote idle (R-IDLE) message 5.3, in order to transfer the downstream SNR values to the VTU-C.

In most cases, the modem of the second transceiver, which is located at the customer premises, remains in the same location after installation for a significant duration. In principle, the automatic profile selection described above desirably is be done only once after the installation unless the modem is relocated. For the cases where the modem has already applied the automatic profile switching algorithm and decided on a particular profile, an efficient technique can be used for future training. The modem training in the above case can be expedited by remembering the following parameters of the last successful automatic profile switching initialization: the profile, the value $kl_0$ and the highest downstream sub-carrier frequency. Based on the history information and the currently available information for these parameters, the modem can decide whether the last profile is still valid or not by cross-checking the values. In the case when both $kl_0$ and the highest downstream sub-carrier frequency remain unchanged or within a tolerance, the modem continues training with the initialized profile. On the other hand, if either $kl_0$ or the highest downstream sub-carrier frequency is different from the history, then the modem re-initializes by performing a complete profile choice.

The invention claimed is:

1. A method for transmitting and receiving data over a communication channel, comprising:
   making a first decision during an initialization process, the first decision comprising selecting a first subset of communication parameters defining a profile from a plurality of predetermined profiles that are provided for different deployment situations of broadband equipment in various broadband environments;
   making a second decision during the initialization process, the second decision comprising deciding whether one or more of the communication parameters of the first subset of said profile are to be changed depending on information about the communication channel, the information about the communication channel corresponding to transmission characteristics of the channel; and
   delaying transition from the initialization process to transmitting and receiving payload data by an amount of time sufficient to make the first and second decisions during the initialization process.

2. The method according to claim 1, wherein:
   the information about the communication channel comprises information indicating a signal-to-noise ratio of data transmitted over the communication channel.

3. The method according to claim 1, wherein:
   the information about the communication channel comprises information indicating channel attenuation including one or more of a physical length or an electrical length of the communication channel.

4. The method according to claim 1, wherein the second decision includes selecting a second subset of communication parameters from the plurality of pre-determined profiles of communication parameters.

5. The method according to claim 1, wherein the payload data is transmitted and received using a discrete multi-tone (DMT) technique.

6. The method according to claim 5, wherein:
   bit loading is performed by allocating bits of a bit stream to frequency carriers and determining gains of the frequency carriers, wherein the bit allocation and the gain allocation are based on an estimation of a signal-to-noise ratio of the communication channel; and
   the allocated bits and gains form the information about the signal-to-noise ratio.

7. The method according to claim 1, wherein:
   the initialization process comprises a first part and a second part, the first part comprising a handshake procedure wherein basic information about modes of operation of two transceiver stations is communicated, the second part comprising an actual initialization that obtains system parameters which are used by at least one of the transceivers during showtime when the payload data is transmitted; and
   the information about the communication channel is collected during the second part of the initialization process.

8. The method according to claim 7, wherein the second part is repeated using the changed communication parameters.

9. The method according to claim 1, wherein:
   the information about the communication channel is collected in one transceiver station which is in communication with another transceiver station over the channel.

10. The method according to claim 9, wherein:
    the information about the communication channel is collected in the other transceiver station.

11. The method according to claim 1, wherein:
    the first and second decisions are made in one transceiver station which is in communication with another transceiver station over the channel.

12. The method according to claim 11, wherein the transceiver stations include:
    a first transceiver station which is located at a central office station; and
    a second transceiver station which is located at a remote station on customer premises.

13. The method according to claim 1, wherein:
    the information about the communication channel is transferred from a second transceiver station to a first transceiver station of a transceiver station pair in communication with one another over the channel.

14. The method of claim 1, wherein selecting a first subset of communication parameters defining a profile is selected from the subset of profiles consisting of those profiles defined by ITU G.994.X.

15. The method of claim 1, further comprising modifying an update message transmitted between a pair of transceivers to include the information about the changed communication parameters.

16. The method of claim 1, wherein the broadband equipment is DSL equipment and the various broadband environments are various DSL environments.

17. The method of claim 1, wherein delaying transition from the initialization process to transmitting and receiving payload data by an amount of time sufficient to make the first and second decisions during the initialization process comprises increasing a length of a valid timeout occurring directly after issuance of a Remote-Physical Dependent Message (R-PMD) message.

18. A transceiver, comprising:
    a first apparatus adapted to select in a first decision during an initialization a first subset of communication parameters defining a profile from a plurality of predetermined profiles that are provided for different deployment situations of broadband equipment in various broadband environments; and
    the first apparatus being further configured to decide in a second decision during the initialization whether one or more of the communication parameters of the first subset of said profile are to be changed depending on information about the communication channel, the information about the communication channel corresponding to transmission characteristics of the channel, and delay transition from the initialization process to transmitting and receiving payload data by an amount of time sufficient to make the first and second decisions during the initialization process.

19. The transceiver according to claim 18, further comprising:
   a memory to store the plurality of predetermined profiles; and
   a second apparatus coupled to the memory to select one of the plurality of predetermined profiles.
20. The transceiver according to claim 19, wherein:
   the transceiver is implemented at a central office station.
21. The transceiver according to claim 18, wherein:
   the communication channel is a digital subscriber line (DSL).
22. The transceiver according to claim 18, wherein the broadband equipment is DSL equipment and the various broadband environments are various DSL environments.
23. The transceiver according to claim 18, wherein the first apparatus is configured to delay transition from the initialization process to transmitting and receiving payload data by an amount of time sufficient to make the first and second decisions during the initialization process by increasing a length of a valid timeout occurring directly after issuance of a Remote-Physical Dependent Message (R-PMD) message.

* * * * *